United States Patent
Stokes et al.

[19]

[11] Patent Number: 6,139,668

[45] Date of Patent: Oct. 31, 2000

[54] METHOD AND APPARATUS FOR SIMULTANEOUSLY ASSEMBLING A PLURALITY OF TIRES

[75] Inventors: James Dale Stokes, Akron; Klaus Beer; Kenneth Dean Conger, both of Stow; Dennis Alan Lundell, North Canton; Ralph Damon Ring, Akron; John Patrick Roman, Cuyahoga Falls, all of Ohio

[73] Assignee: The Goodyear Tire & Rubber Company, Akron, Ohio

[21] Appl. No.: 09/202,742

[22] PCT Filed: Sep. 18, 1996

[86] PCT No.: PCT/US96/14942

§ 371 Date: Dec. 15, 1998

§ 102(e) Date: Dec. 15, 1998

[87] PCT Pub. No.: WO98/12043

PCT Pub. Date: Mar. 26, 1998

[51] Int. Cl.[7] .................................... B29D 30/20
[52] U.S. Cl. .................. 156/111; 156/125; 156/127; 156/133; 156/396; 156/405.1; 156/406.2
[58] Field of Search ..................... 156/111, 123, 156/130, 133, 396, 406.2, 405.1, 125, 127

[56] References Cited

U.S. PATENT DOCUMENTS

| 2,407,152 | 9/1946 | Haase ........................................ 156/111 |
| 4,105,487 | 8/1978 | Suzuki et al. . | |
| 4,314,864 | 2/1982 | Loeffler et al. ........................... 156/111 |
| 4,443,290 | 4/1984 | Leoffler et al. ........................... 156/396 |
| 4,531,561 | 7/1985 | Ippen et al. .............................. 152/510 |
| 4,732,640 | 3/1988 | Goodfellow ............................. 156/396 |
| 4,753,707 | 6/1988 | Crombie . | |
| 4,985,100 | 1/1991 | Sasaki et al. ............................. 156/111 |
| 5,141,587 | 8/1992 | Sumiuchi et al. ....................... 156/396 |
| 5,399,225 | 3/1995 | Miyamoto et al. . | |
| 5,411,626 | 5/1995 | Coretta et al. ........................... 156/396 |
| 5,540,803 | 7/1996 | Miyamoto et al. ..................... 156/111 |

FOREIGN PATENT DOCUMENTS

| 0026315 | 4/1981 | European Pat. Off. . | |
| 0167224 | 1/1986 | European Pat. Off. . | |
| 3-114737 | 5/1991 | Japan .................................... 156/111 |

*Primary Examiner*—Geoffrey L. Knable
*Attorney, Agent, or Firm*—Frederick K Lacher

[57] ABSTRACT

A tire assembly method and apparatus are disclosed which utilize at least two rotatable turrets (16, 18) that each have two drums (26, 28, 58, 60) and at least one transfer unit (156) for transferring tire components from one turret to another. The preferred embodiment of the invention features three turrets (16, 18, 20) and two transfer units (156, 170), wherein a carcass band is assembled on the drums of a first turret (16) the tread package is assembled on a third turret (20), and the complete tire carcass is assembled on a second turret (18), in between the first and third turrets. Simultaneous, continuous and sequential building and assembly of tire carcass bands and tread packages for a plurality of tires is provided by the method and apparatus of this invention.

15 Claims, 10 Drawing Sheets

METHOD AND APPARATUS FOR SIMULTANEOUSLY ASSEMBLING A PLURALITY OF TIRES

TECHNICAL FIELD

This invention pertains to the art of methods and apparatuses for assembling tires, and more specifically to methods and apparatuses for simultaneously and sequentially assembling a plurality of tires.

BACKGROUND ART

In the past, machines to build tires have included combinations of drums for forming tire carcasses and transfer units for transferring partially built tire carcasses from drum to drum. One such tire building apparatus is disclosed in U.S. Pat. No. 5,141,587 to Sumiuchi et al. Sumiuchi utilizes three drums for forming green partially built carcasses and transfer units that slide along guide rails for transferring the partially built carcasses from one drum to another. At any given time, tire components can be applied to the partially built carcasses of three tires. Applicants recognized the need to increase the efficiency and production of tire building apparatuses. Applicants utilize a number of rotating turrets to successionally move tire forming drums from component applicator to component applicator without having to transfer a partially formed tire carcass from a drum more than once, thereby reducing the time to produce tires while providing tire uniformity and production efficiency.

The present invention contemplates a new and improved tire building apparatus and method which is simple in design, effective in use, and overcomes the foregoing difficulties and others while providing better and more advantageous overall results.

DISCLOSURE OF INVENTION

In accordance with the present invention, a new and improved tire building apparatus and method is provided which increases tire building efficiency and uniformity while reducing production time.

According to one aspect of the present invention a tire building apparatus is disclosed, the tire having a plurality of associated tire components. The tire building apparatus for assembling the plurality of tire components includes at least two turrets, each of the turrets being rotatable about a generally horizontal axis, drum shafts extending from each of the turrets in generally opposite directions, drums mounted on the drum shafts, the turrets and the drum shafts being in general alignment with one another along an axis extending between the turrets, tire component application means positioned adjacent the drums for applying the associated tire components to the drums to form a tire carcass band, at least one transfer unit located between the turrets for transferring the tire carcass band from one of the drums of one of the turrets to one of the drums of the other of the turrets, and tire removal means for removing the tire carcass from the tire building apparatus.

According to another aspect of the present invention, there is provided a tire building apparatus for assembling a plurality of associated tire components to form a tire carcass including a first turret having a first drum shaft and a second drum shaft extending from the first turret in opposite directions, the first drum shaft having a first drum mounted thereon, the second drum shaft having a second drum mounted thereon and the first turret being rotatable to move the first drum and the second drum between a first station and a second station; the second turret having a third drum shaft and a fourth drum shaft extending from the second turret in opposite directions, the third drum having a third drum mounted thereon, the fourth drum shaft having a fourth drum mounted thereon and the second turret being rotatable to move the third drum and the fourth drum between a third station and a fourth station; the third turret having a fifth drum shaft and a sixth drum shaft extending from the third turret in opposite direction, the fifth drum shaft having a fifth drum mounted thereon, the sixth drum shaft having a sixth drum mounted thereon; and the third turret being rotatable to move the fifth drum and the sixth drum between a fifth station and a sixth station; means for applying tire components to the first drum and the second drum at the first station; means for applying tire components to the first drum and the second drum at the second station; means for applying tire components to the fifth drum and the sixth drum at the fifth station; means for applying tire components to the fifth drum and the sixth drum at the sixth station; a first transfer unit located between the first turret and the second turret for transferring applied tire components from the first station of the first turret to the third station of the second turret; means for applying beads to the applied tire components during transfer between the first station and the third station; a second transfer unit located between the second turret and the third turret for transferring applied tire components from the fifth station of the third turret to the fourth station of the second turret to assemble a tire carcass; and tire carcass removal means for unloading the tire carcass.

According to another aspect of the present invention, there is provided a method of building a tire using a tire building apparatus having a first turret spaced from a second turret, a transfer unit positioned between the first turret and the second turret, the first turret having a first drum and a second drum, the second turret having a third drum and a fourth drum, a first station and a second station located at the first turret for positioning the first drum and the second drum adjacent tire component applicators, a third and a fourth station located at the second turret for positioning the third drum and the fourth drum to receive a carcass band from the transfer unit and other tire components. The method includes the steps of positioning the first drum in the first position; applying a first position tire component to the first drum; rotating the first turret to move the first drum to the second position; applying a second position tire component to the first drum to form a tire band; rotating the first turret to move the first drum and the tire band to the first position; transferring the tire band from the first drum to the third drum at the third station by the transfer unit and applying beads to the tire band; rotating the second turret to move the third drum to the fourth position; applying additional tire components at the fourth position to form a tire carcass; rotating the second turret to move the third drum from the fourth position to the third position, and removing the tire carcass from the third drum for transfer to storage or vulcanization facilities.

One advantage of the present invention is that five tires may be assembled simultaneously.

Another advantage of the present invention is that a partially built carcass is transferred from one drum to another drum only once.

Another advantage of the present invention is that the tire building apparatus can produce a tire ready for vulcanization approximately every 35–40 seconds.

Another advantage is that the layout of the tire component applicators provides ready access for changing the applicators for building tires with different specifications and for servicing.

Still other benefits and advantages of the invention will become apparent to those skilled in the art to which it pertains upon a reading and understanding of the following detailed specification.

BRIEF DESCRIPTION OF DRAWINGS

The invention may take physical form in certain parts and arrangement of parts, a preferred embodiment of which will be described in detail in this specification and illustrated in the accompanying drawings which form a part hereof and herein.

DETAILED DESCRIPTION OF THE INVENTION

Figure 1:
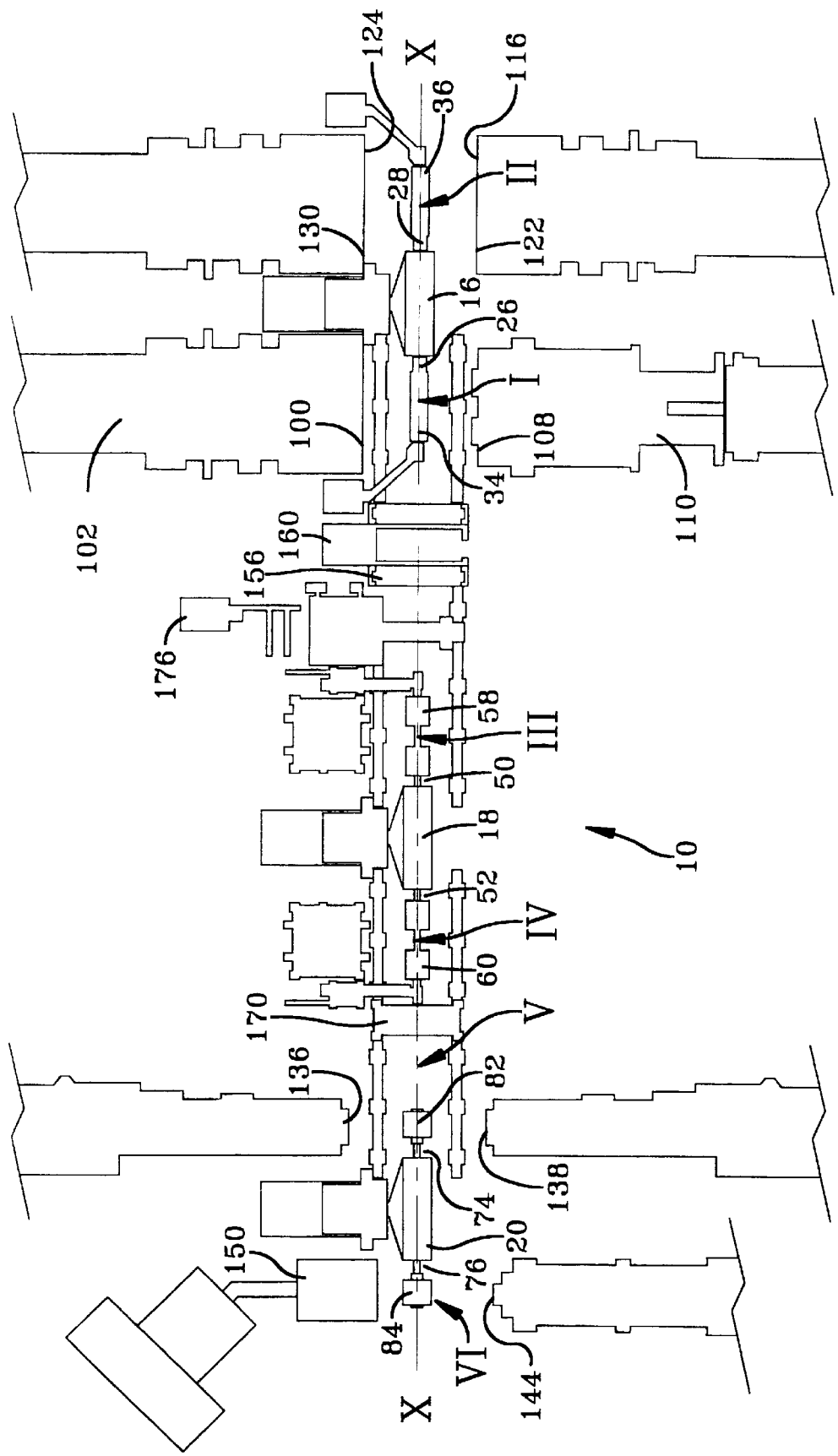
FIG. 1 is a schematic plan view of a tire building apparatus.

Referring now to the drawings wherein the showings are for purposes of illustrating a preferred embodiment of the invention only and not for purposes of limiting the same, FIG. 1 shows a plan view of a tire building apparatus 10. The tire building apparatus 10 is designed to build a number of tires simultaneously in a step-by-step process. Preferably, the tire building apparatus 10 partially builds five tire carcasses simultaneously at peak performance.

The tire building apparatus 10 has at least two turrets 16, 18 and may include a third turret 20. The first turret 16 has two drum shafts 26, 28 that extend from the turret in generally opposite directions. Drums 34, 36 are mounted on the ends of the drum shafts 26, 28 of the first turret 16. The first turret 16 is rotatable in a manner such that drums 34, 36 rotate between a first station I and a second station II. At an initial point of time, drum 34 is located at the first station I, while drum 36 is located at the second station II. When the first turret 16 rotates, drum 34 moves to the second station II and drum 36 moves to the first station I.

The second turret 18 has two drum shafts 50, 52 that extend from the turret in generally opposite directions. Drums 58, 60 are mounted on the ends of the drum shafts 50, 52 of the second turret 18. The second turret 18 is rotatable in a manner such that drums 58, 60 are moved between a third station III and a fourth station IV. At an initial point of time, drum 58 is located at the third station III, while drum 60 is located at the fourth station IV. When the second turret 18 rotates, drum 58 is moved to the fourth station IV and drum 60 is moved to the third station III. The first turret 16, the drum shafts 26, 28 of the first turret, the second turret 18, and the drum shafts 50, 52 of the second turret are preferably in general alignment with one another.

The third turret 20 has two drum shafts 74, 76 that extend from the turret in generally opposite directions. Drums 82, 84 are mounted on the ends of the drum shafts 74, 76 of the third turret 20. The third turret 20 rotates in a manner such that drums 82, 84 are moved between a fifth station V and a sixth station VI. At an initial point in time, drum 82 is located at the fifth station V, while drum 84 is located at the sixth station VI. When the third turret 20 rotates, drum 82 is moved to the sixth station VI and drum 84 is moved to the fifth station V. The third turret 20 and the drum shafts 74, 76 of the third turret are preferably in a generally axial alignment with the first turret 16 and second turret 18.

At the first station I, there are means for applying a tire component to drums 34, 36, such as a liner by an applicator 100 that is fed by a liner conveyor 102. The first station I also has a means for applying a tire component to drums 34, 36, such as a sidewall by an applicator 108 that may be fed by a sidewall conveyor 110. In the preferred embodiment of the invention, the liner applicator 100 and the sidewall applicator 108 are positioned on opposite sides of the axis x—x. The liner applicator 100 first applies the liner to one of the drums 34, 36, and then the sidewall applicator 108 applies the sidewalls.

At the second station II there is located toeguard applying means such as toeguard applicator 116 for applying a toeguard to the drums 34, 36. Also, means for applying other tire components such as plies and a wedge to the drums, by a first ply applicator 122, a second ply applicator 124, and a wedge applicator 130 located at the second station II. In the preferred embodiment of the invention, the toeguard applicator 116 and the first ply applicator 122 are on one side of the axis x—x, and the second ply applicator 124 and the wedge applicator 130 are on the opposite side of the axis. The toeguard is preferably applied first at the second station II, and then the first ply is applied. Thereafter, the second ply and the wedge are applied.

At the fifth station V there are located means for applying another tire component such as a breaker to the drums 82, 84, by a first breaker applicator 136 and a second breaker applicator 138. In the preferred embodiment of the present invention, the first breaker applicator 136 is on one side of the axis x—x, and the second breaker applicator 138 is on the opposite side of the axis x—x. Preferably, the first breaker is applied to either of the drums 82, 84 by the first breaker applicator 136, and then the second breaker is applied by the second breaker applicator 138.

At the sixth station VI there are located means for applying additional tire components such as a tread, by a tread applicator 144. At the sixth station VI there may also be located means for applying other tire components such as a spiral overlay, with a spiral overlay applicator 150 if high-performance tires are being produced by the tire building apparatus 10.

Figure 2:
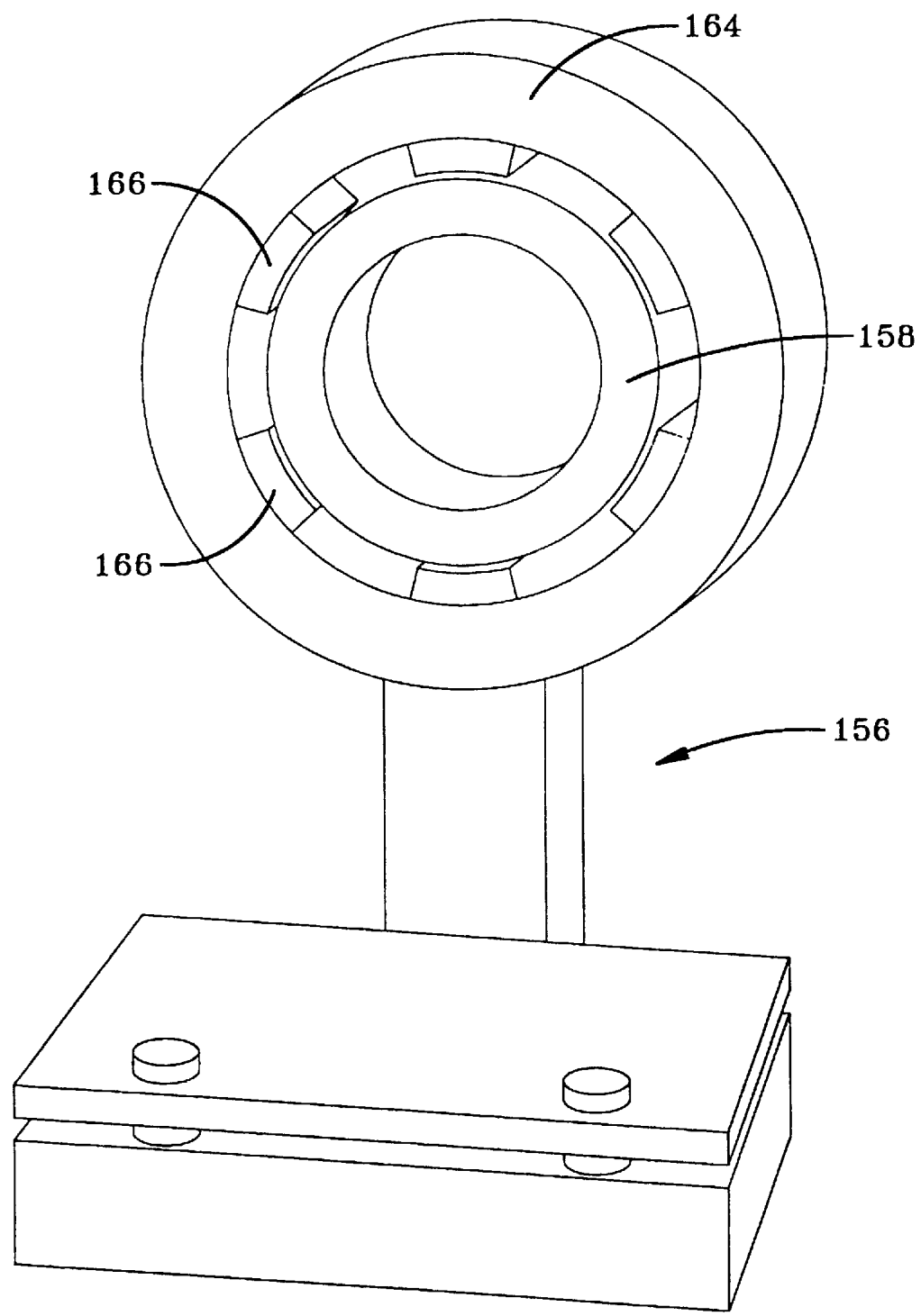
FIG. 2 is a front view of a transfer unit.

With reference to FIGS. 1 and 2, a first transfer unit 156 is located between the first turret 16 and the second turret 18. The first transfer unit 156 picks up the tire components after they are assembled in the form of a band 158 on one of the drums 34, 36 at the first station I and second station II and transfers the band from the first station I to one of the drums 58, 60 at the third station III. The first transfer unit 156 also contains a bead loading apparatus 160 for applying beads to the band 158 as the band is transferred from the first station I to the third station III. The first transfer unit 156 preferably has a cylindrical or substantially cylindrical support structure 164 fitted with radially movable shoes 166 that grip the band 158. The support structure 164 is moved axially of the apparatus 10 over one o the drums 34, 36 and the movable shoes 166 are moved radially inward to grip the band 158. The first transfer unit 156 then transports the band 158 from one of the drums 34, 36 to one of the waiting drums 58, 60 at the third station III, where the support structure 164 surrounds the waiting drum and places the band over the drum. The band 158 is then released by the movable shoes 166, and the first transfer unit 156 moves away from the drum.

At the third station III, the band 158 is shaped on one of the drums 58, 60 of the second turret 18 as the turret rotates the band to the fourth station IV.

A second transfer unit 170 is located between the second turret 18 and the third turret 20. The second transfer unit 170 is axially movable to transfer a complete breaker and tread package from the fifth station V and to place it around the band 158 waiting at the fourth station IV. The second transfer unit 170 preferably operates in the same manner as the first transfer unit 156 as shown in FIG. 2.

Figure 3:
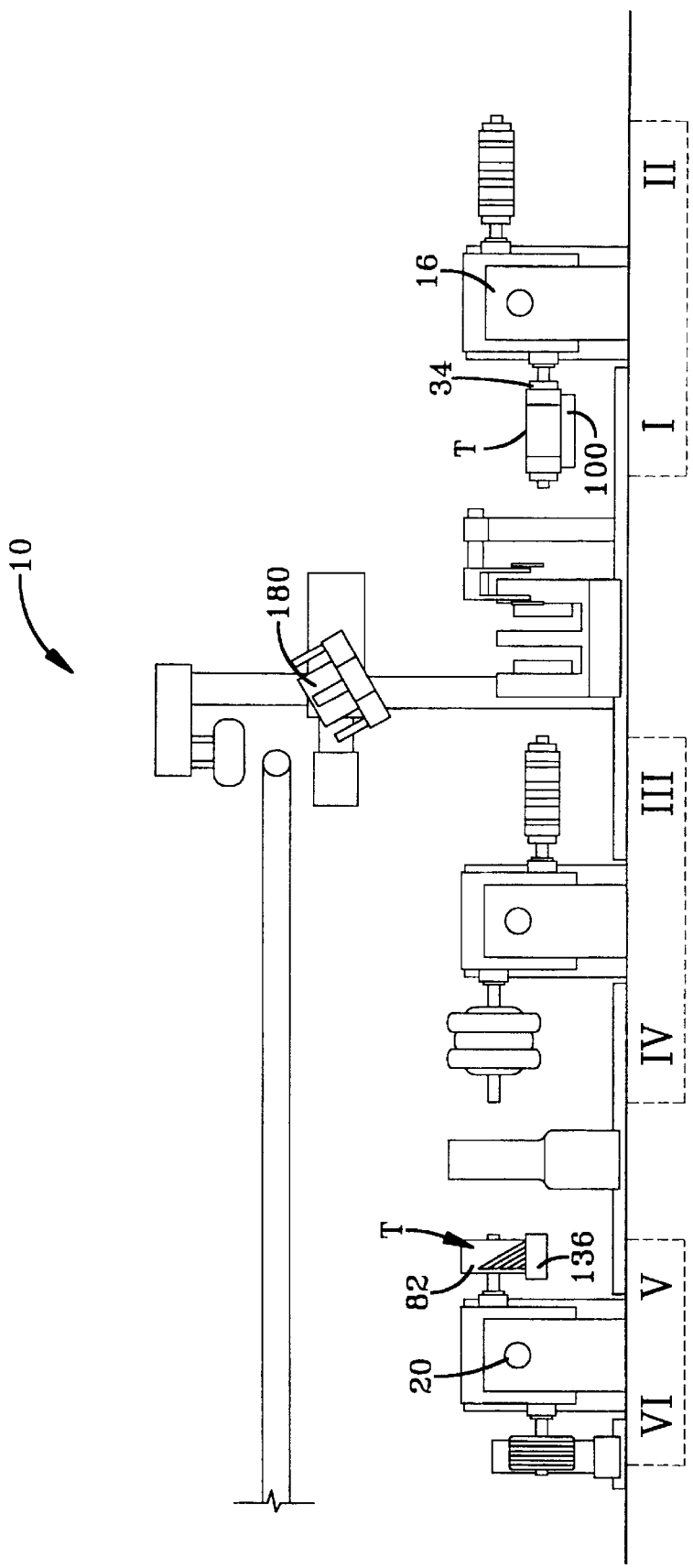
FIG. 3 is a side view of the tire building apparatus showing the first step in tire building procedure.

Although five tires may be build simultaneously on the tire building apparatus 10, FIGS. 3–9 follow the production of one tire on the tire building apparatus to illustrate the timing and steps involved in the process. FIG. 3 shows the beginning step of tire construction on the tire building apparatus 10. First, the inner liner is applied at the first station I to the drum 34 by liner applicator 100. Then the sidewall is applied by sidewall applicator 108. Next, the sidewall is automatically spliced, or in some cases manually spliced by a worker. After the sidewall is spliced, the first turret 16 is rotated moving the drum 34 from the first station I to the second station II. At approximately the same time, the first breaker is applied to drum 82 at the fifth station V of the third turret 20 by the first breaker applicator 136. Next, the second breaker is applied on top of the first breaker on drum 82 by the second breaker applicator 138. After the second breaker is applied, the third turret 20 is rotated, moving drum 82 from the fifth station V to the sixth station VI.

Figure 4:
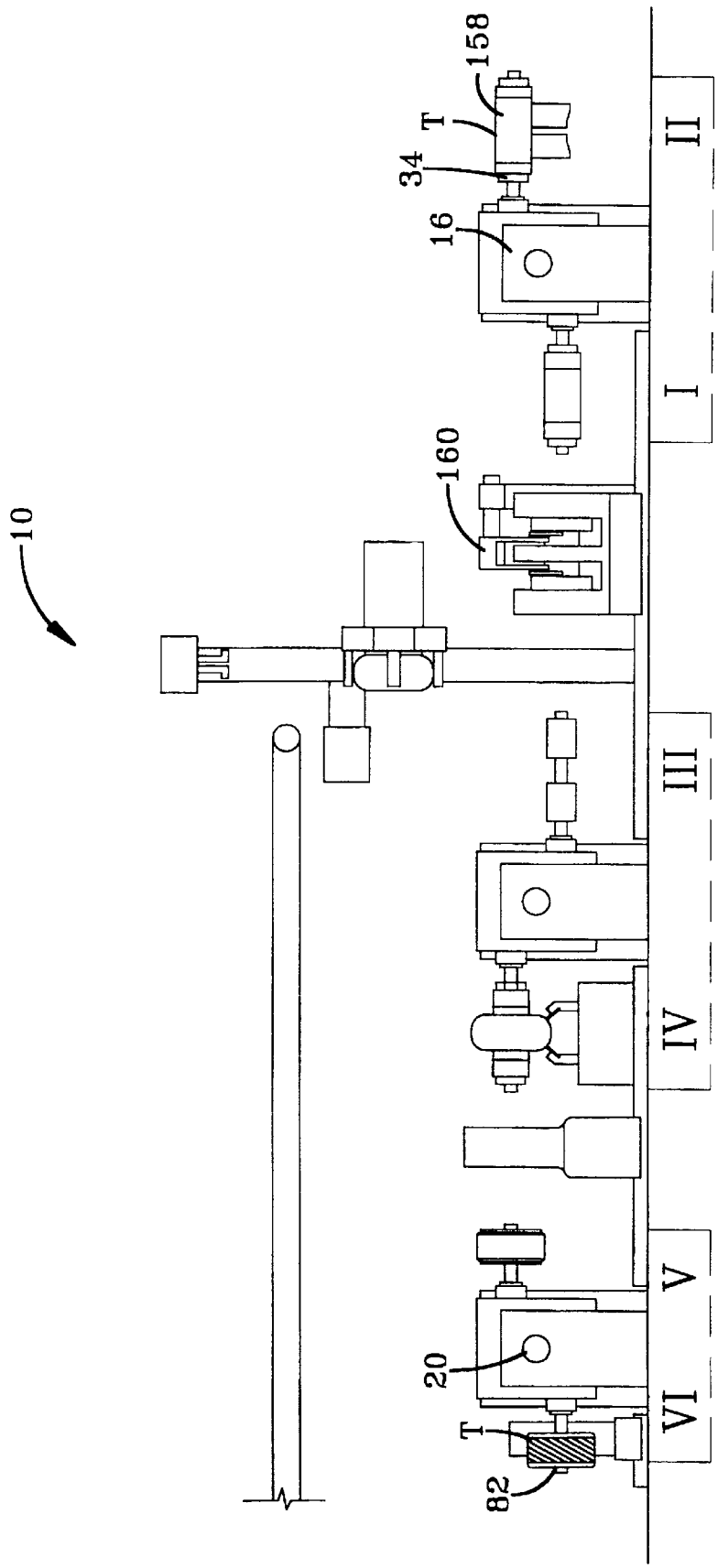
FIG. 4 is a side view of the tire building apparatus showing the second step in tire building procedure.

FIG. 4 shows the tire building apparatus 10 with drum 34 rotated to the second station II and drum 82 rotated to the sixth station VI. At the second station II, the liner is stitched. After the stitching of the liner, the toeguard is then applied by the toeguard applicator 116. The first ply is then applied by the first ply applicator 122. The second ply is applied by the second ply applicator 124. Finally the wedge is applied by the wedge applicator 133. After the wedge is applied, the first turret 16 is rotated, moving the drum 234 with the band 158 comprised of liner, sidewall, toeguard, plies, and wedge back to the first station I to await transfer to the third station III. The drum 34 may be expanded before or after application of any component to place the component in tension and remove trapped air. At the sixth station VI, the spiral overlay may be applied by the spiral overlay applicator 150 on top of the breakers if required, or the drum 82 may sit idle for a period of time until a tread is applied on top of the breakers. The tread is then applied by the tread applicator 144, and then the tread is manually spliced if required. The third turret 20 is then rotated, moving drum 82 back to the fifth station V to await transfer to the fourth station IV.

Figure 5:
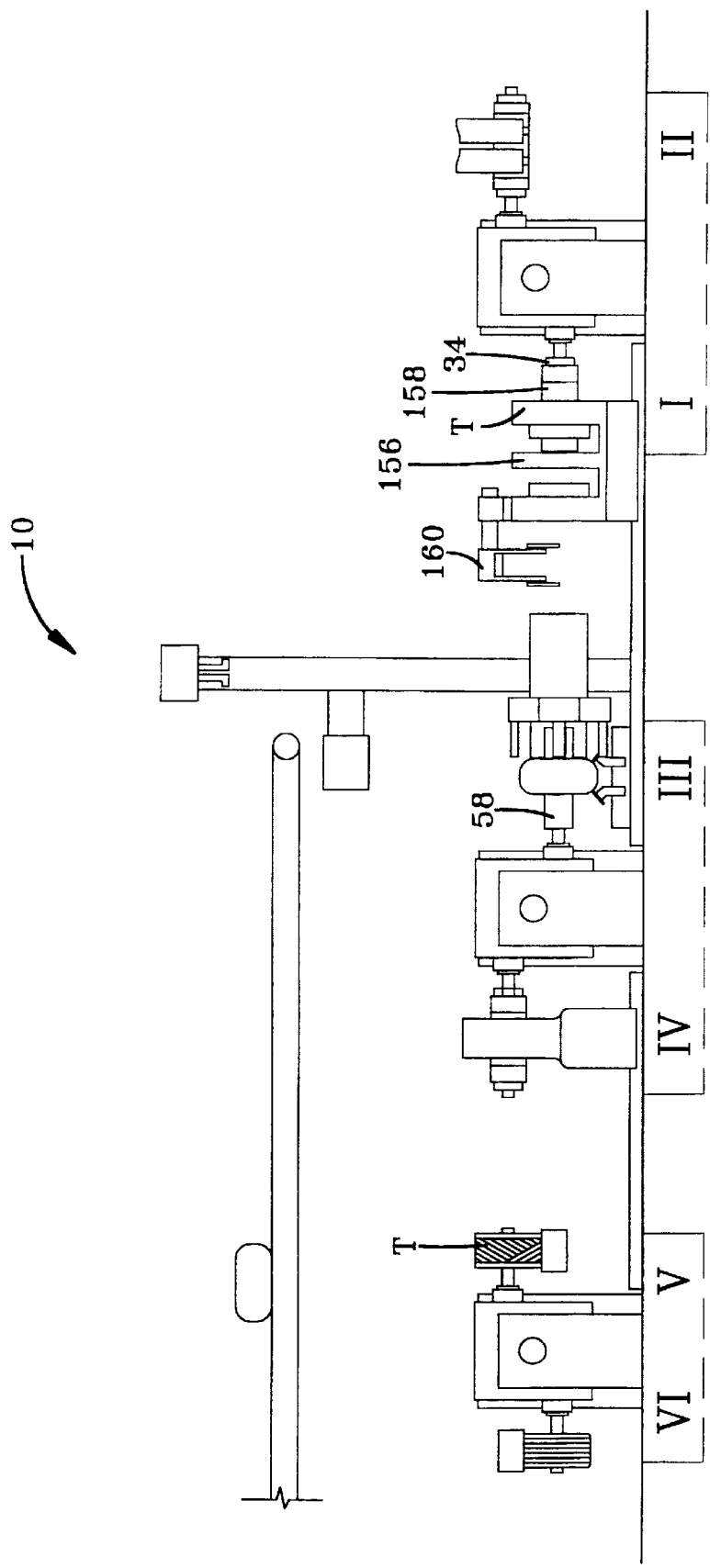
FIG. 5 is a side view of the tire building apparatus showing the third step in tire building procedure.

FIG. 5 shows the first transfer unit 156 moved into position to remove the band 158 from the drum 34 and move it to the drum 58 at the third station III. Beads may be applied to the band 158 at the first station I or at the third station III by a bead loading apparatus 160 connected to the first transfer unit 156.

Figure 6:
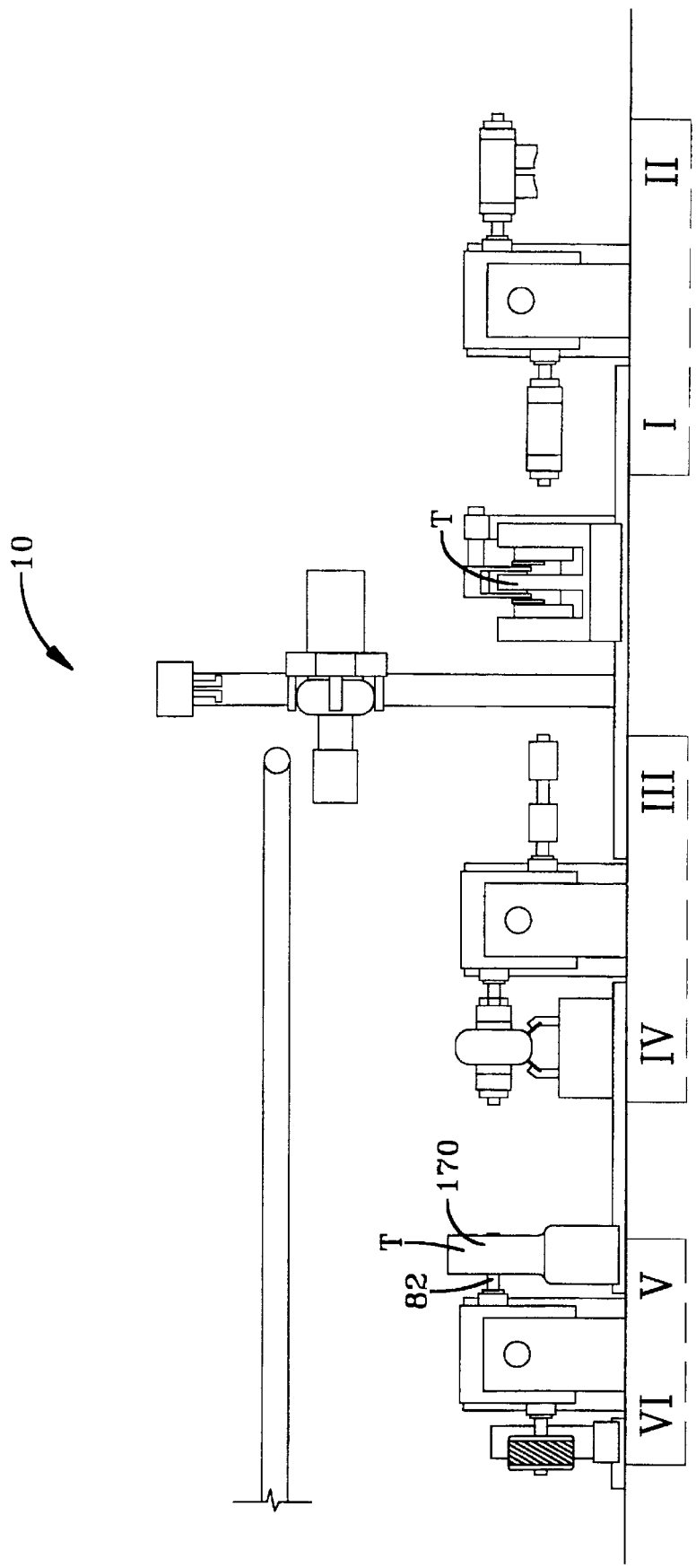
FIG. 6 is a side view of the tire building apparatus showing the fourth step in tire building procedure.

FIG. 6 shows the next step of the production of a tire carcass as the second transfer unit 170 is moved into position to pick up the breaker and tread package from drum 82 at the fifth station V.

Figure 7:
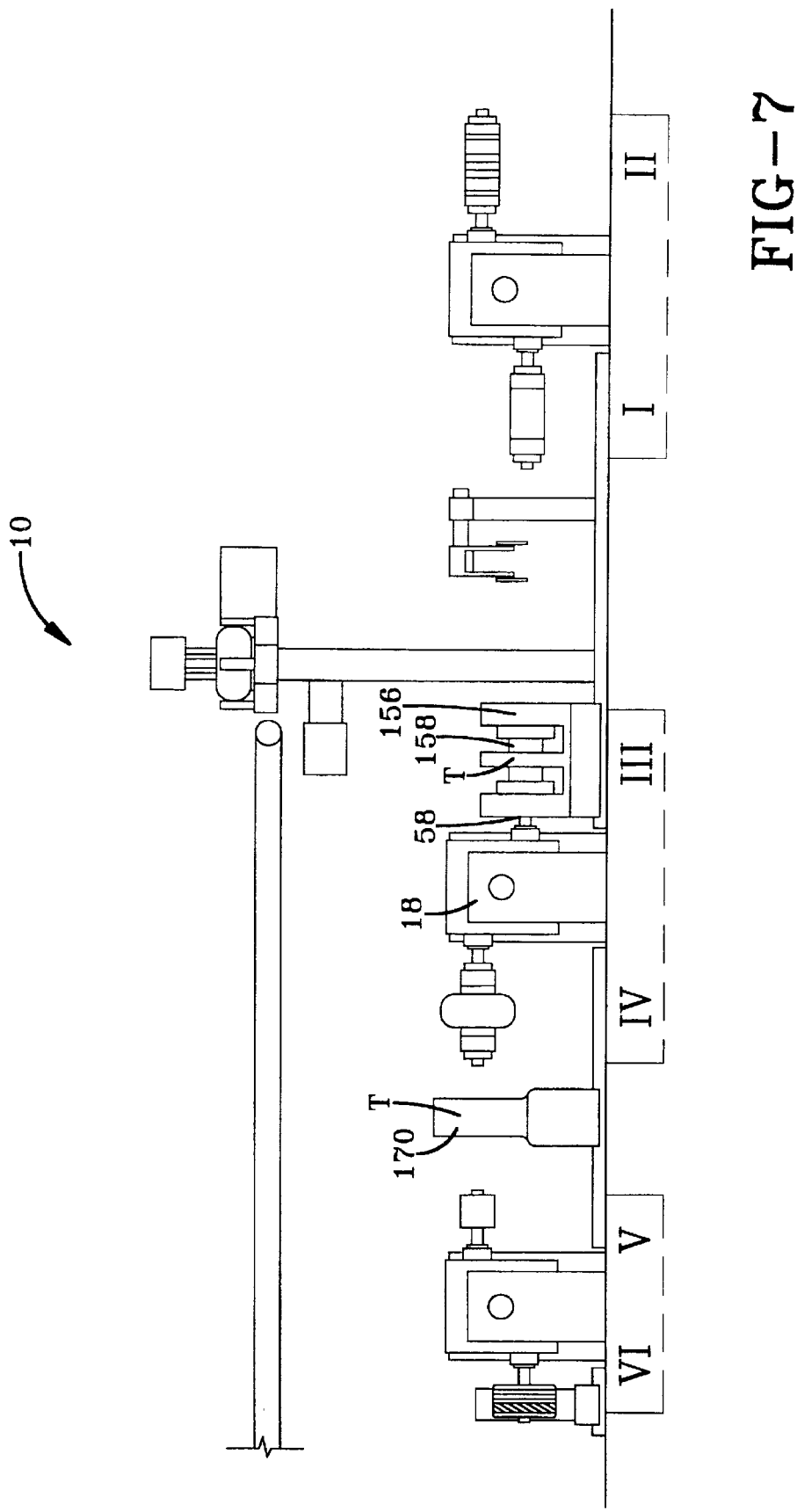
FIG. 7 is a side view of the tire building apparatus showing the fifth step in tire building procedure.

FIG. 7 shows the first transfer unit 156 in position to place the band 158 on the drum 58 at the third station III. After the band 158 is transferred to the drum 58 at the third station III, the second turret 18 is rotated, moving the drum 58 to the fourth station IV. As the second turret 18 is rotated, the drum 58 inflates to shape the band 158 and turns up part of the band around the beads. Further turn-up may be required as the drum 58 remains at the fourth station IV awaiting the breaker and tread package to complete the shaping and turn-up. A stitching device of the type commonly used in the art then may be used to stitch the sidewall.

Figure 8:
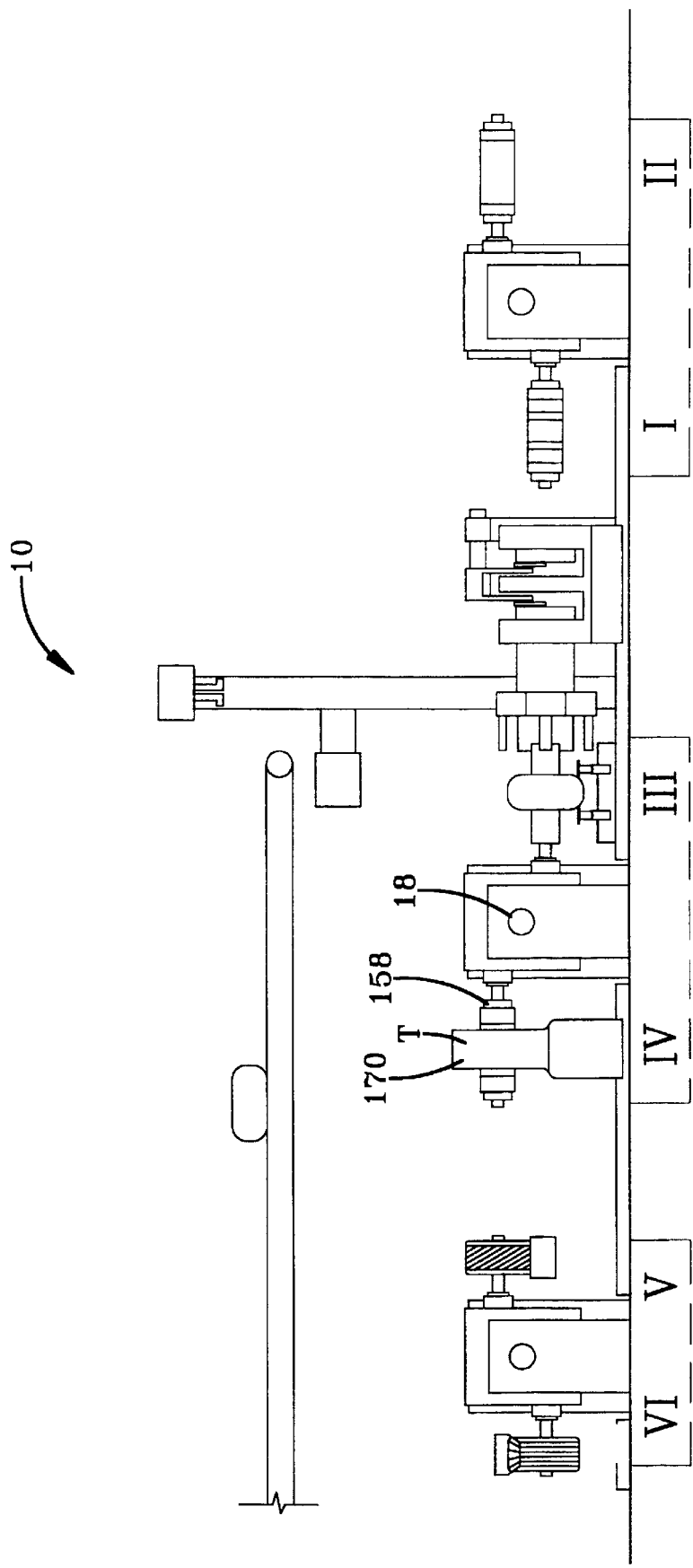
FIG. 8 is a side view of the tire building apparatus showing the sixth step in tire building procedure.
Figure 9:
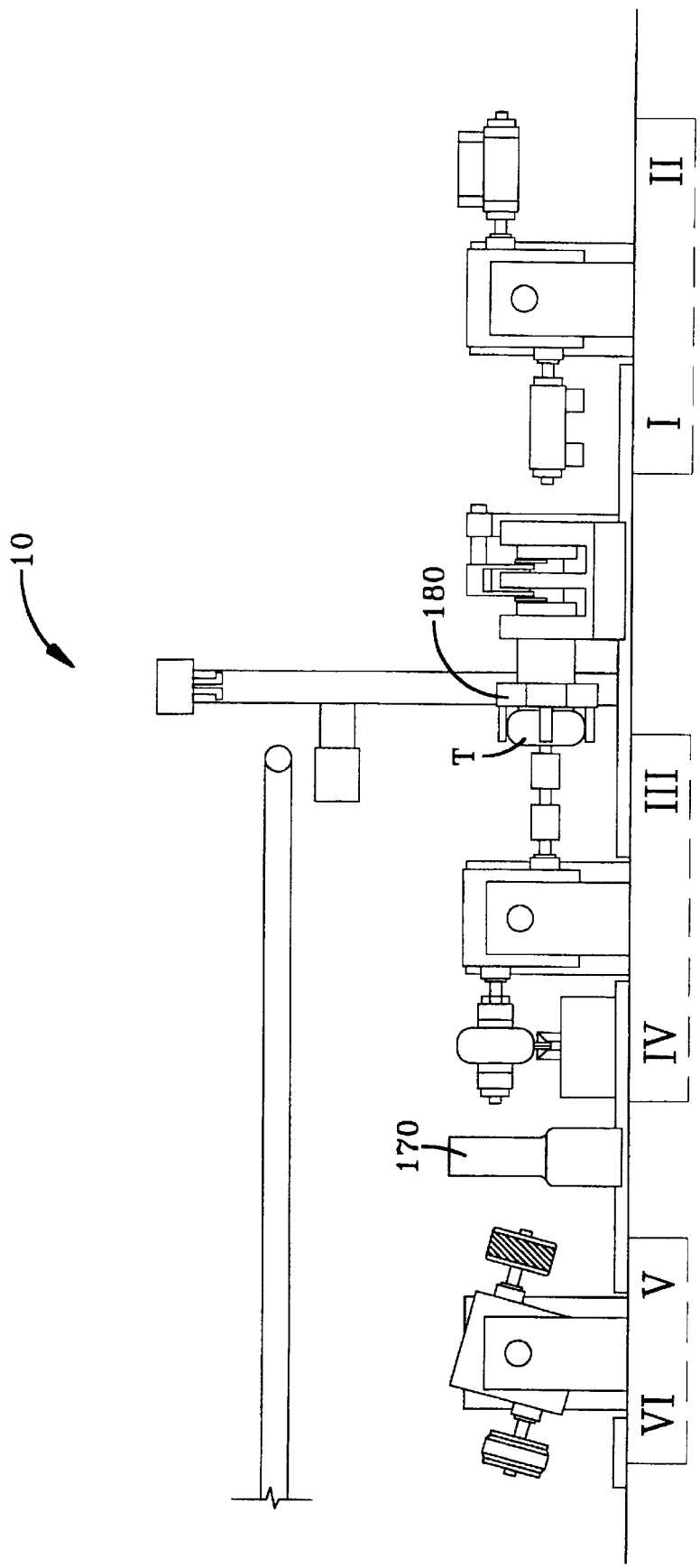
FIG. 9 is a side view of the tire building apparatus showing the seventh step in the tire building procedure; and, FIG. 10 is a plan view of a modification including an injection molded tread pick-up apparatus for applying an injection molded tread to be used in conjunction with the present invention.

FIG. 8 shows the second transfer unit 170 in position for placing the breaker and tread package onto the band 158 at the fourth station IV. The second turret 18 is then rotated, moving the drum 58 back to the third station III after the second transfer unit 170 moves back to a neutral position as shown in FIG. 9. At the third station III, the breaker and tread package is stitched. The tire carcass, now ready to be vulcanized, is removed from the tire building apparatus 10 by a tire remover 180 at the third station III. A tire carcass is removed from the tire building apparatus 10 approximately once every 35–40 seconds.

Figure 10:
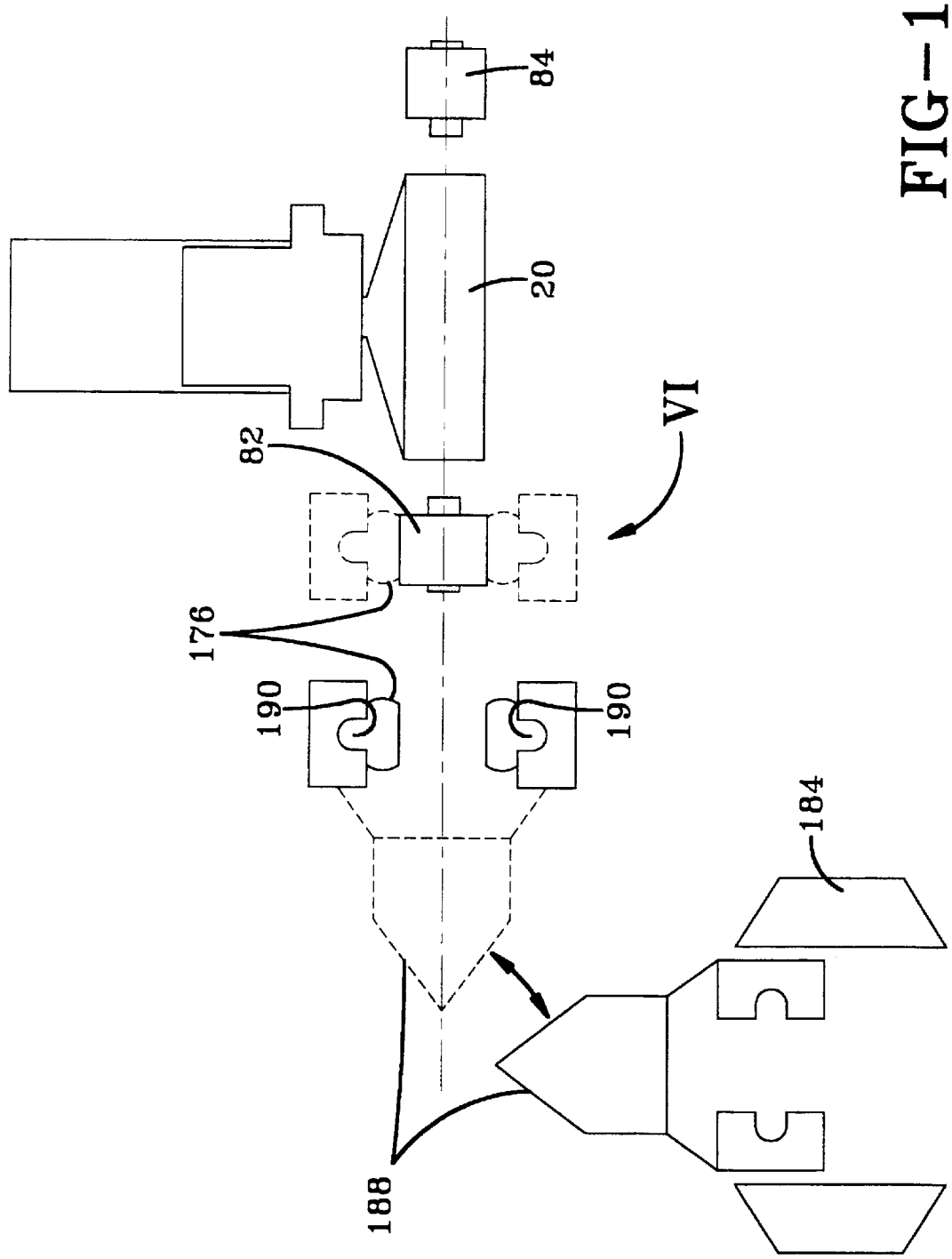

FIG. 10 shows an alternate embodiment of the present invention where an injection molded tread is placed directly over the breaker at the sixth station VI. The injection molded tread either is removed from the injector body 184 directly by a pick-up apparatus 188 or is stored and then loaded onto the pick-up apparatus. The pick-up apparatus 188 may use a pick-up shoe to grasp the injection molded tread, or, as shown in FIG. 10, the pick-up apparatus may have a vacuum ring 190 that grasps and holds the injection molded tread in place. The pick-up apparatus 188 then transfers the injection molded tread to the sixth station VI and places the tread onto the drum 82 holding the breakers. If the pick-up shoe is used in the pick-up apparatus 188, then the shoe simply releases the injection molded tread. If the vacuum ring 190 is used in the pick-up apparatus 188, then air in the vacuum ring is removed to create a vacuum that holds the injection molded tread in place, and the tread is removed by allowing air into the vacuum ring, thereby eliminating the vacuum and releasing the tread.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A method of building a tire comprising the steps of:
   (a) providing a tire building apparatus (10) having a first turret (16) spaced from a second turret (18), a transfer unit (156) positioned between said first turret (16) and said second turret (18), said first turret (16) having a first drum (34) and a second drum (36), said second turret (18) having a third drum (58) and a fourth drum (60), a first station (I) and a second station (II) located at said first turret (16) for positioning said first drum (34) and said second drum (36) adjacent tire component applicators (122, 124), a third station (III) and a fourth station (IV) located at said second turret (18) for positioning said third drum (58) and said fourth drum (60) to receive a carcass band from said transfer unit (156) and other tire components, a third turret (120) spaced from said second turret (18) with a fifth drum (82) and a sixth drum (84), a fifth station (V) and a sixth station (VI) located at said third turret (20), and a second transfer unit (170) positioned between said third turret (20) and said second turret (18);

(b) positioning said first drum (34) in said first station (I);

(c) applying a first station (I) tire component to said first drum (34);

(d) rotating said first turret (16) about a generally horizontal axis to move said first drum (34) to said second position (II);

(e) applying a second station (II) tire component to said first drum (34) to form a tire band (158);

(f) rotating said first turret (16) about said generally horizontal axis to move said first drum (34) and said tire band (158) to said first station (I);

(g) transferring said tire band (158) from said first drum (34) to said third drum (58) at said third station (III) by said transfer unit (156) and applying beads to said tire band (158);

(h) rotating said second turret (18) about a generally horizontal axis to move said third drum (58) to said fourth station (IV);

(i) applying a tire component to said fifth drum (82) at said fifth station (V) at approximately the same time the steps (b) through (h) are performed;

(j) rotating said third turret (20) about a generally horizontal axis to move said fifth drum (82) to said sixth station (VI);

(k) applying another tire component to said fifth drum (82) to provide a tread breaker package;

(l) rotating said third turret (20) about said generally horizontal axis to move said fifth drum (82) to said fifth station (V);

(m) transferring said tread breaker package from said fifth station (V) to said fourth station (IV) of said second turret (18) by said second transfer unit (170), after said second turret (18) moves said third drum (58) to said fourth station (IV);

(n) rotating said second turret (18) about said generally horizontal axis to move said third drum (58) from said forth station (IV) to said third station (III);

(o) removing said tire carcass from said third drum (58) for transfer to storage or vulcanization facilities; and, (p) maintaining said first drum (34), said second drum (36), said third drum (58), said fourth drum (60), said fifth drum (82) and said sixth drum (84) in general alignment along an axis through out the time the steps (b) through (o) are performed.

2. The method of claim 1 further comprising the steps of:
wherein step (c) applying a first station (I) tire component to said first drum (34), comprises the step of applying a plurality of first station (I) tire components to said first drum (34) from both sides of said first drum (34); and,
wherein step (e) applying a second station (II) tire component to said first drum (34) to form a tire band (158), comprises the step of applying a plurality of second station (II) tire components to said first drum (34) to form a tire band (158) from both sides of said first drum (34).

3. The method of claim 1 wherein prior to step (g) transferring said tire band (158) from said first drum (34) to said third drum (58) at said third station (III) by said transfer unit (156) and applying beads to said tire band (158), the method comprises the step of:
expanding said third drum (58) to shape said tire band.

4. The method of claim 1 wherein after step (c) applying a first station (I) tire component to said first drum (34), the method comprises the step of:
applying a second first station (I) tire component to said first drum (34).

5. The method of claim 4 wherein after step (e) applying a second station (II) tire component to said first drum (34) to form a tire band (158), the method comprises the step of:
applying a second second station (II) tire component to said first drum (34) to form a tire band (158).

6. The method of claim 5 wherein said first station (I) tire component and said second first station (I) tire component are applied from opposite sides of said first drum (34).

7. The method of claim 5 wherein said second station (II) tire component and said second second station (II) tire component are applied from opposite sides of said first drum (34).

8. The method of claim 1 wherein step (k) applying another tire component to said fifth drum (82) to provide a tread breaker package, comprises the step of:
applying a tire tread to said fifth drum (82) at said sixth station (VI).

9. The method of claim 8 wherein said tire tread is an injection molded tread (176) and wherein prior to the step of applying a tire tread to said fifth drum (82) at said sixth station (VI), the method comprises the steps of:
loading said tire tread (176) in a pick up apparatus (188); and,
transferring said tire tread (176) to said sixth station (VI) for application to said fifth drum (182).

10. The method of claim 8 wherein said tire tread is an injection molded tread (176) and wherein prior to the step of applying a tire tread to said fifth drum (82) at said sixth station (VI), the method comprises the steps of:
removing said tire tread (176) directly from an injector body by a pick up apparatus (188); and,
transferring said tire tread (176) to said sixth station (VI) for application to said fifth drum (182).

11. A tire building apparatus for assembling a plurality of associated tire components to form a tire carcass, comprising:

(a) a first turret (16), a second turret (18), and a third turret (20), said first turret (16) rotating between a first station (I) and a second station (II), said second turret (18) rotating between a third station (III) and a fourth station (IV), and said third turret (20) rotating between a fifth station (V) and a sixth station (VI);

(b) each of said turrets (18, 19, 20) being rotatable about a generally horizontal axis, drum shafts (26, 28, 50, 52, 74, 76) extending from each of said turrets in generally opposite directions, drums (34, 36, 58, 60, 82, 84) mounted on said drum shafts (26, 28, 50, 52, 74, 76), said turrets and said drum shafts being in general alignment with one another along an axis extending between said turrets (16, 18, 20);

(c) tire component application means positioned adjacent said drums (34, 36, 58, 60) for applying said associated tire components to said drums to form a tire carcass band (158);

(d) a first transfer unit (156) located between said first and second turrets (16, 18) for transferring said tire carcass band (158) from one of said drums (34, 36) of said first turret (16) to one of said drums (58, 60) of said second turret (18);

(e) means for applying a breaker to one of said drums (82, 84) of said third turret (20) and means for applying a tread to said breaker forming a tread breaker package at one of said drums (82, 84) of said third turret (20);

(f) means for applying beads to said tire band (154);

(g) a second transfer unit (170) for transferring said tread breaker package from said fifth station (V) of said third turret (20) to said carcass band at said fourth station (IV) of said second turret (18); and, (h) tire removal means (180) for removing said tire carcass from said tire building apparatus.

12. The tire building apparatus of claim 11 wherein said tire component application means comprises:

means for applying a sidewall and an inner liner to one of said drums (34, 36) of said first turret (16); and, means for applying a toeguard, a first ply, a second ply and a wedge to one of said drums (34, 36) of said first turret (16), said inner liner, said sidewall, said toeguard, said first ply, said second ply, and said wedge forming said tire carcass band (158).

13. The tire building apparatus of claim 11 wherein said tire component application means comprises:

means for applying an inner liner and a sidewall to one of said drums (34, 36) at said first station (I) of said first turret (16); and, means for applying a toeguard, a first ply, a second ply, and a wedge to one of said drums (34, 36) at said second station (II) of said first turret (16), said inner liner, said sidewall, said toeguard, said first ply, said second ply, and said wedge forming said tire carcass (158).

14. The tire building apparatus of claim 13 wherein said tire component application means comprises:

means for applying said breaker to one of said drums (82, 84) at said fifth station (V) of said third turret (20); and, means for applying said tread to one of said drums (82, 84) at said sixth station (VI) of said third turret (20).

15. The tire building apparatus of claim 14 wherein said tire component application means further comprises:

means for applying a spiral overlay to one of said drums (82, 84) at said sixth station (VI) of said third turret (20).

* * * * *